US012282275B2

(12) United States Patent
Odaka

(10) Patent No.: US 12,282,275 B2
(45) Date of Patent: Apr. 22, 2025

(54) IMAGE FORMING APPARATUS AND COOLING METHOD CAPABLE OF SUPPRESSING UNNECESSARY COOLING OF FIXING PORTION

(71) Applicant: KYOCERA Document Solutions Inc., Osaka (JP)

(72) Inventor: Yoshiyuki Odaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/421,878

(22) Filed: Jan. 24, 2024

(65) Prior Publication Data

US 2024/0255873 A1 Aug. 1, 2024

(30) Foreign Application Priority Data

Jan. 26, 2023 (JP) ................................ 2023-010194

(51) Int. Cl.
*G03G 15/20* (2006.01)

(52) U.S. Cl.
CPC ..... *G03G 15/2017* (2013.01); *G03G 15/2042* (2013.01); *G03G 15/205* (2013.01)

(58) Field of Classification Search
CPC ............. G03G 15/205; G03G 15/2017; G03G 15/2042; G03G 15/2046
USPC .................................................... 399/69, 334
See application file for complete search history.

(56) References Cited

U.S. PATENT DOCUMENTS

2006/0127119 A1* 6/2006 Sato ................... G03G 15/2017 399/69
2017/0315482 A1* 11/2017 Tsukamura .......... G03G 15/205
2018/0356753 A1* 12/2018 Okugawa ........... G03G 15/2017
2019/0064712 A1* 2/2019 Tokunaga ............ G03G 21/206
2021/0088946 A1* 3/2021 Hatazaki ............ G03G 15/6573
2021/0373491 A1* 12/2021 Tanaka ............... G03G 15/2017
2022/0299914 A1* 9/2022 Doda ................. G03G 15/2039
2024/0069472 A1* 2/2024 Kakubari ........... G03G 15/2039

FOREIGN PATENT DOCUMENTS

JP 2013182153 A 9/2013

* cited by examiner

*Primary Examiner* — Robert B Beatty
(74) *Attorney, Agent, or Firm* — Alleman Hall & Tuttle LLP

(57) ABSTRACT

An image forming apparatus includes a fixing portion, a first acquisition processing portion, a first determination processing portion, and a restriction processing portion. The fixing portion is provided rotatably around a rotation shaft. The first acquisition processing portion acquires first temperature information regarding the temperature of the fixing portion at the end of a first image forming process of forming an image on a first sheet whose size in a width direction along the rotation shaft is smaller than a reference size. The first determination processing portion determines an execution time of a cooling process of cooling the fixing portion, based on the first temperature information. In a case where the execution time of the cooling process determined by the first determination processing portion exceeds an upper limit time, the restriction processing portion restricts the execution of the cooling process exceeding the upper limit time.

6 Claims, 6 Drawing Sheets

IMAGE FORMING APPARATUS AND COOLING METHOD CAPABLE OF SUPPRESSING UNNECESSARY COOLING OF FIXING PORTION

INCORPORATION BY REFERENCE

This application is based upon and claims the benefit of priority from the corresponding Japanese Patent Application No. 2023-010194 filed on Jan. 26, 2023, the entire contents of which are incorporated herein by reference.

BACKGROUND

The present disclosure relates to an electrophotographic image forming apparatus and a cooling method.

An electrophotographic image forming apparatus includes a fixing portion, such as a fixing belt, that fixes a toner image transferred onto a sheet to the sheet.

SUMMARY

An image forming apparatus according to an aspect of the present disclosure includes a fixing portion, a first acquisition processing portion, a first determination processing portion, and a restriction processing portion. The fixing portion is provided rotatably around a predetermined rotation shaft and fixes a toner image to a sheet. The first acquisition processing portion acquires first temperature information regarding the temperature of the fixing portion at the end of a first image forming process of forming an image on a first sheet whose size in a width direction along the rotation shaft is smaller than a predetermined reference size. The first determination processing portion determines the execution time of a cooling process of cooling the fixing portion, based on the first temperature information. When the execution time of the cooling process determined by the first determination processing portion exceeds a predetermined upper limit time, the restriction processing portion restricts the execution of the cooling process exceeding the upper limit time.

A cooling method according to another aspect of the present disclosure is executed by an image forming apparatus including a fixing portion provided rotatably around a predetermined rotation shaft and configured to fix a toner image to a sheet, and includes an acquisition step, a determination step, and a restriction step. In the acquisition step, first temperature information regarding the temperature of the fixing portion at the end of a first image forming process of forming an image on a first sheet whose size in a width direction along the rotation shaft is smaller than a predetermined reference size is acquired. In the determination step, the execution time of a cooling process of cooling the fixing portion is determined based on the first temperature information. In the restriction step, in a case where the execution time of the cooling process determined by the determination step exceeds a predetermined upper limit time, the execution of the cooling process exceeding the upper limit time is restricted.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the accompanying drawings. It is noted that the following embodiment is an example of embodying the present disclosure and does not limit the technical scope of the present disclosure.

[Configuration of Image Forming Apparatus 100]

First, a configuration of an image forming apparatus 100 according to an embodiment of the present disclosure will be described with reference to FIG. 1 and FIG. 2.

It is noted that, for convenience of description, the vertical direction in an installed state (the state shown in FIG. 1) in which the image forming apparatus 100 can be used is defined as an up-down direction D1. In addition, a front-rear direction D2 is defined assuming that the surface of the image forming apparatus 100 shown in FIG. 1 on the left side on the figure is the front side (front surface). In addition, a left-right direction D3 is defined with reference to the front side of the image forming apparatus 100 in the installed state.

The image forming apparatus 100 is a multifunction peripheral having a plurality of functions such as a facsimile function and a copy function in addition to a scan function for reading an image of a document sheet and a print function for forming an image based on image data. It is noted that the present disclosure may also be applied to image forming apparatuses such as a printer, a facsimile machine, and a copier.

Figure 1:
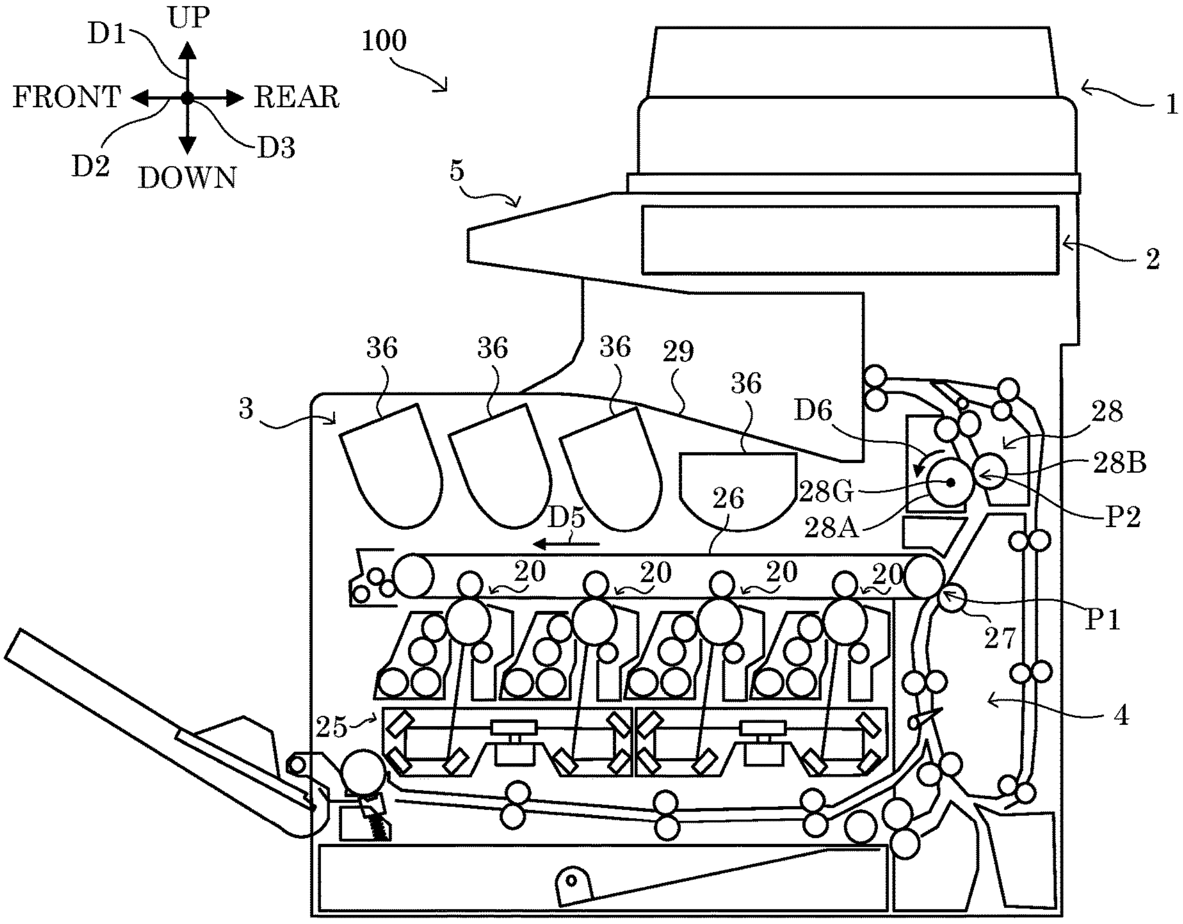
FIG. 1 is a cross-sectional view showing a configuration of an image forming apparatus according to an embodiment of the present disclosure.
Figure 2:
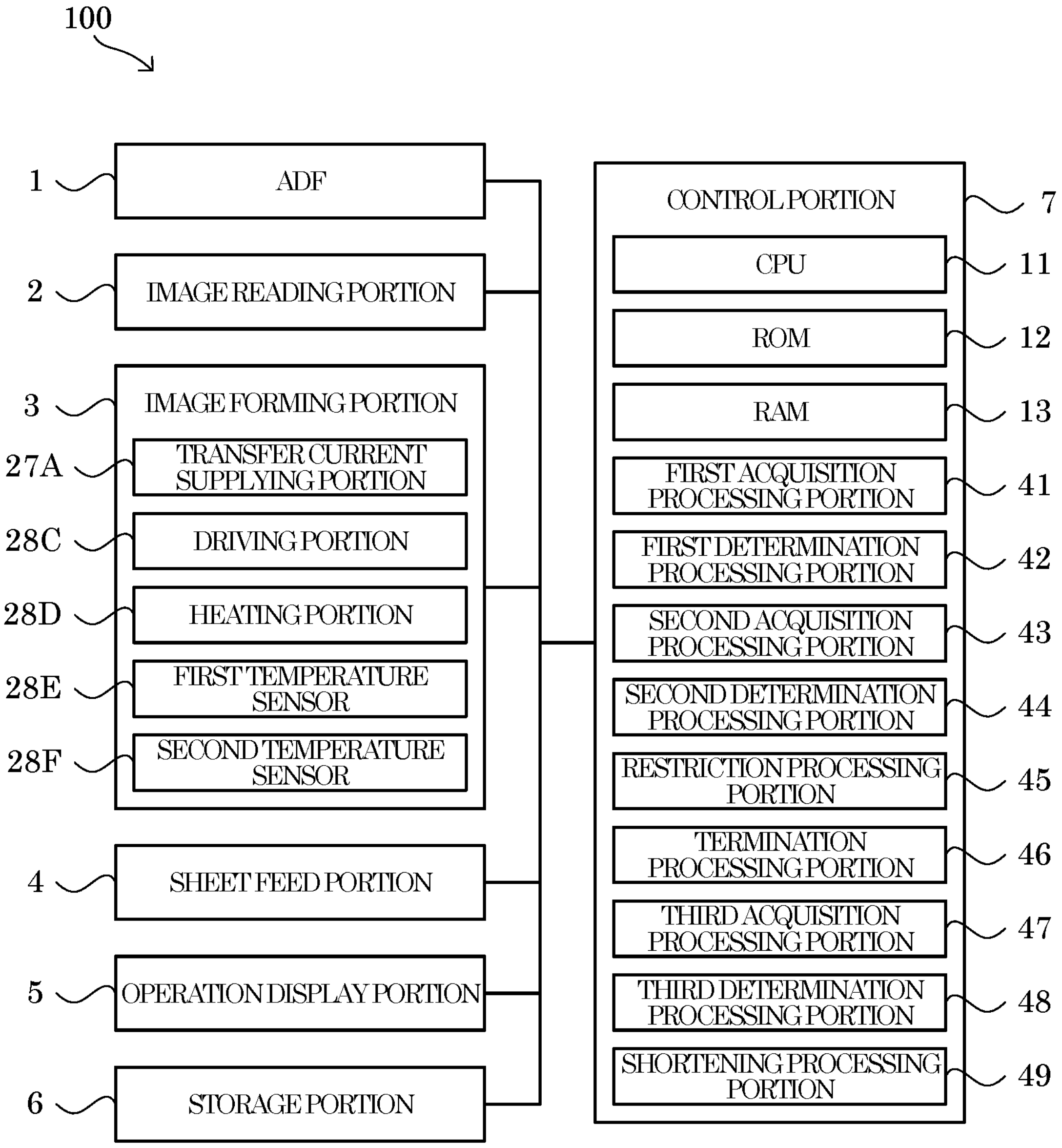
FIG. 2 is a block diagram showing a system configuration of the image forming apparatus according to the embodiment of the present disclosure.

As shown in FIG. 1 and FIG. 2, the image forming apparatus 100 includes an auto document feeder (ADF) 1, an image reading portion 2, an image forming portion 3, a sheet feed portion 4, an operation display portion 5, a storage portion 6, and a control portion 7.

The ADF 1 conveys a reading target document sheet to be read by the scan function. The ADF 1 includes a document sheet loading portion, a plurality of conveying rollers, a document sheet holder, and a sheet discharge portion.

The image reading portion 2 implements the scan function. The image reading portion 2 includes a document sheet table, a light source, a plurality of mirrors, an optical lens, and a charge coupled device (CCD).

The image forming portion 3 implements the print function. Specifically, the image forming portion 3 forms a color or monochrome image on a sheet supplied from the sheet feed portion 4 in accordance with an electrophotographic method.

The sheet feed portion 4 supplies a sheet to the image forming portion 3. The sheet feed portion 4 includes a sheet feed cassette, a manual feed tray, and a plurality of conveying rollers.

The operation display portion 5 is a user interface of the image forming apparatus 100. The operation display portion 5 includes a display portion such as a liquid crystal display that displays various types of information in response to a control instruction from the control portion 7, and an operation portion such as operation keys or a touch panel that inputs various types of information to the control portion 7 in response to a user's operation.

The storage portion 6 is a nonvolatile storage device. For example, the storage portion 6 is a nonvolatile memory such as a flash memory.

The control portion 7 performs overall control of the image forming apparatus 100. As shown in FIG. 2, the control portion 7 includes a CPU 11, a ROM 12, and a RAM 13. The CPU 11 is a processor that executes various arithmetic processes. The ROM 12 is a nonvolatile storage device in which information such as control programs for causing the CPU 11 to execute various processes are stored in advance. The RAM 13 is a volatile or nonvolatile storage device used as a temporary storage memory (work area) for various processes executed by the CPU 11. The CPU 11 performs overall control of the image forming apparatus 100 by executing various control programs stored in the ROM 12 in advance.

It is noted that the control portion 7 may be a control portion provided separately from the main control portion which performs overall control of the image forming apparatus 100. In addition, the control portion 7 may be composed of an electronic circuit such as an integrated circuit (ASIC).

[Configuration of Image Forming Portion 3]

Next, a configuration of the image forming portion 3 will be described with reference to FIG. 1 to FIG. 3. Here, FIG. 3 is a cross-sectional view showing a configuration of a plurality of image forming units 20, an intermediate transfer belt 26, and a secondary transfer roller 27.

As shown in FIG. 1, the image forming portion 3 includes four image forming units 20, a laser scanning unit 25, an intermediate transfer belt 26, a secondary transfer roller 27, a fixing device 28, and a sheet discharge tray 29.

Of the four image forming units 20, the image forming unit 21 (see FIG. 3) forms a yellow (Y) toner image. Of the four image forming units 20, the image forming unit 22 (see FIG. 3) forms a cyan (C) toner image. Of the four image forming units 20, the image forming unit 23 (see FIG. 3) forms a magenta (M) toner image. Of the four image forming units 20, the image forming unit 24 (see FIG. 3) forms a black (K) toner image. In other words, the image forming portion 3 forms an image on a sheet using the CMYK toners. As shown in FIG. 1 and FIG. 3, the four image forming units 20 are arranged in the order of yellow, cyan, magenta, and black from the front side of the image forming apparatus 100 along the front-rear direction D2.

Figure 3:
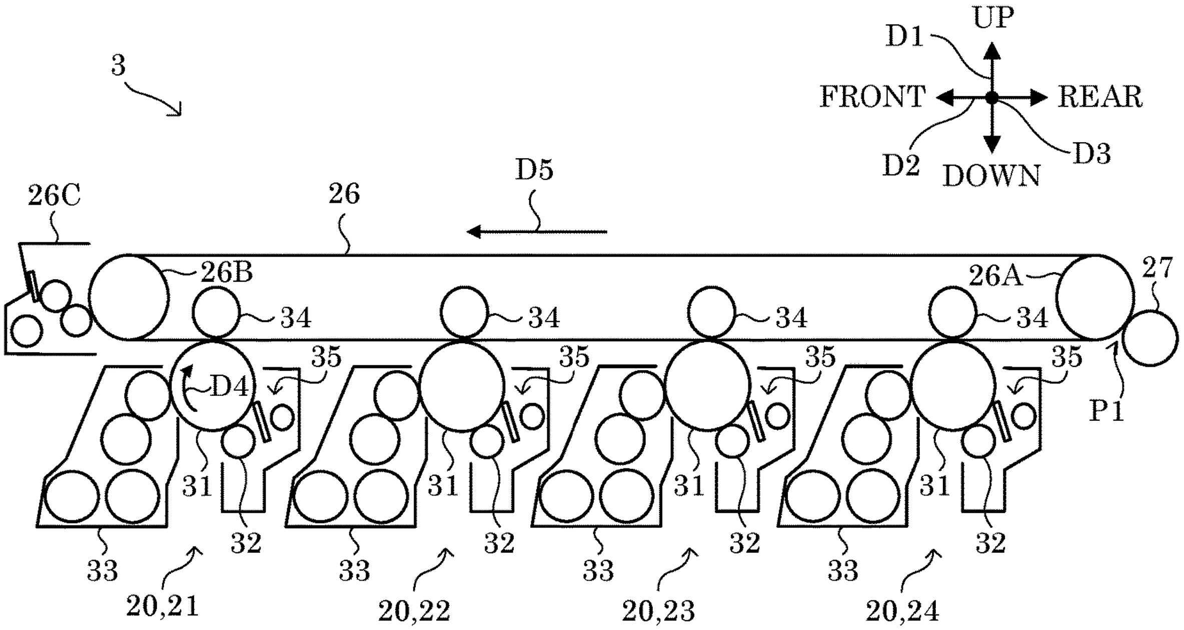
FIG. 3 is a cross-sectional view showing a configuration of an image forming portion of the image forming apparatus according to the embodiment of the present disclosure.

As shown in FIG. 3, each of the image forming units 20 includes a photoconductor drum 31, a charging roller 32, a developing device 33, a primary transfer roller 34, and a drum cleaning member 35. In addition, each of the image forming units 20 includes a toner container 36 shown in FIG. 1.

An electrostatic latent image is formed on the surface of the photoconductor drum 31. For example, the photoconductor drum 31 includes a photosensitive layer formed of amorphous silicon. The photoconductor drum 31 receives rotational drive power supplied from a motor (not shown) and rotates in a rotational direction D4 shown in FIG. 3. Thus, the photoconductor drum 31 conveys the electrostatic latent image formed on its surface.

The charging roller 32 receives application of a preset charging voltage and charges the surface of the photoconductor drum 31. For example, the charging roller 32 positively charges the surface of the photoconductor drum 31. The surface of the photoconductor drum 31 charged by the charging roller 32 is irradiated with light based on image data emitted from the laser scanning unit 25. Thus, an electrostatic latent image is formed on the surface of the photoconductor drum 31.

The developing device 33 develops the electrostatic latent image formed on the surface of the photoconductor drum 31. The developing device 33 includes a pair of stirring members, a magnet roller, and a developing roller. The pair of stirring members stir the developer stored inside the developing device 33. The developer contains toner and carrier. As a result, the toner contained in the developer is positively charged by friction with the carrier contained in the developer. The magnet roller draws up the developer stirred by the pair of stirring members and supplies the toner contained in the developer to the developing roller. The developing roller conveys the toner supplied from the magnet roller to a position facing the photoconductor drum 31. In addition, the developing roller receives application of a preset developing bias voltage and supplies the toner conveyed to the facing position to the photoconductor drum 31. This makes an electrostatic latent image formed on the surface of the photoconductor drum 31 visible (developed). It is noted that the developing device 33 is supplied with toner from the toner container 36.

The primary transfer roller 34 is supplied with a preset primary transfer current and transfers the toner image formed on the surface of the photoconductor drum 31 to the outer peripheral surface of the intermediate transfer belt 26. As shown in FIG. 3, the primary transfer roller 34 is provided so as to face the photoconductor drum 31 with the intermediate transfer belt 26 interposed therebetween.

The drum cleaning member 35 removes toner remaining on the surface of the photoconductor drum 31 after the toner image transfer by the primary transfer roller 34.

The laser scanning unit 25 emits light based on image data toward the surface of the photoconductor drum 31 of each of the image forming units 20.

The intermediate transfer belt 26 is an endless belt member to which a toner image formed on the surface of the photoconductor drum 31 of each of the image forming units 20 is transferred. The intermediate transfer belt 26 is stretched with a predetermined tension by a drive roller 26A (see FIG. 3) and a stretching roller 26B (see FIG. 3). The intermediate transfer belt 26 rotates in a rotational direction D5 shown in FIG. 3 as the drive roller 26A receives rotational drive power supplied from a motor (not shown) and rotates. Thus, the intermediate transfer belt 26 conveys the toner image formed on the outer peripheral surface to a secondary transfer position P1 (see FIG. 3) of a secondary transfer roller 27. It is noted that the outer peripheral surface of the intermediate transfer belt 26 after the toner image is transferred by the secondary transfer roller 27 is cleaned by a belt cleaning device 26C shown in FIG. 3.

The secondary transfer roller 27 is supplied with a preset secondary transfer current and transfers the toner image transferred to the outer peripheral surface of the intermediate transfer belt 26 to a sheet supplied from the sheet feed portion 4. As shown in FIG. 3, the secondary transfer roller 27 is provided so as to face the drive roller 26A with the intermediate transfer belt 26 interposed therebetween. The secondary transfer roller 27 is urged toward the drive roller 26A by an urging member (not shown) so as to come into contact with the intermediate transfer belt 26 at a predetermined nip pressure. The secondary transfer roller 27 is supplied with the secondary transfer current from a transfer current supplying portion 27A shown in FIG. 2. The transfer current supplying portion 27A is a power supply capable of selectively supplying a forward current and a reverse current to the secondary transfer roller 27. The secondary transfer roller 27 transfers the toner image formed on the intermediate transfer belt 26 to the sheet at the secondary transfer position P1 (see FIG. 3) where the secondary transfer roller 27 comes into contact with the intermediate transfer belt 26. The secondary transfer roller 27 is an example of the transfer portion of the present disclosure.

The fixing device 28 fixes the toner image transferred to the sheet by the secondary transfer roller 27 to the sheet. As shown in FIG. 1, the fixing device 28 includes a fixing belt 28A and a pressure roller 28B. In addition, the fixing device 28 includes a driving portion 28C, a heating portion 28D, a first temperature sensor 28E, and a second temperature sensor 28F shown in FIG. 2. The fixing belt 28A is provided rotatably around a rotation shaft 28G (see FIG. 1) and fixes the toner image transferred to the sheet onto the sheet. The rotation shaft 28G is a shaft extending in the left-right direction D3. The heating portion 28D heats the fixing belt 28A in response to power supply. The pressure roller 28B is urged toward the fixing belt 28A by an urging member (not shown) so as to come into contact with the fixing belt 28A at a predetermined nip pressure. The driving portion 28C supplies rotational drive power to the pressure roller 28B to rotate the pressure roller 28B. As the pressure roller 28B rotates, the fixing belt 28A rotates accordingly in a rotational direction D6 shown in FIG. 1. The toner image transferred to the sheet is heated and pressed when the sheet passes through a fixing position P2, and is fixed to the sheet. The fixing position P2 is a position where the fixing belt 28A and the pressure roller 28B are brought into contact with each other. The first temperature sensor 28E detects the temperature of a central portion in a width direction of the fixing belt 28A. The width direction is a direction along the rotation shaft 28G. In the fixing device 28, the driving of the heating portion 28D is controlled so that the temperature detected by the first temperature sensor 28E becomes a predetermined fixing temperature. The second temperature sensor 28F detects the temperature of an end portion in the width direction of the fixing belt 28A. The fixing belt 28A is an example of the fixing portion of the present disclosure. It is noted that the fixing portion of the present disclosure may be a member with a shape different from a belt, such as a fixing roller.

A sheet to which a toner image has been fixed by the fixing device 28 is discharged to the sheet discharge tray 29.

By the way, in the image forming apparatus 100, when a first image formation process of forming an image on a first sheet whose size in the width direction is smaller than a predetermined reference size is completed, the temperature outside the contact area of the fixing belt 28A with the first sheet may excessively rise. In this state, when a second image formation process of forming an image on a second sheet whose size in the width direction is larger than that of the first sheet on which the image was formed immediately before is executed, a problem called high-temperature offset occurs in which toner adheres to the area of the fixing belt 28A where the temperature has excessively risen and the toner adheres to the subsequent sheet. In contrast, it is conceivable to execute a cooling process of cooling the fixing belt 28A after the execution of the first image formation process.

However, the temperature of the fixing belt 28A decreases with the lapse of time from the end of the first image formation process. Therefore, in a configuration in which the cooling process is executed unlimitedly after the execution of the first image formation process, the cooling of the fixing belt 28A is wasted when the time from the end of the first image formation process to the reception of the instruction to execute the second image formation process is long.

In contrast, the image forming apparatus 100 according to the embodiment of the present disclosure can suppress unnecessary cooling of the fixing belt 28A.

[Configuration of Control Portion 7]

Next, a configuration of the control portion 7 will be described with reference to FIG. 2.

As shown in FIG. 2, the control portion 7 includes a first acquisition processing portion 41, a first determination processing portion 42, a second acquisition processing portion 43, a second determination processing portion 44, a restriction processing portion 45, a termination processing portion 46, a third acquisition processing portion 47, a third determination processing portion 48, and a shortening processing portion 49.

Specifically, the ROM 12 of the control portion 7 stores in advance operation control programs for causing the CPU 11 to function as the respective portions described above. By executing the operation control programs stored in the ROM 12, the CPU 11 functions as the respective portions described above.

It is noted that the operation control programs may be recorded on a computer-readable recording medium such as a CD, a DVD, or a flash memory, and may be read from the recording medium and stored in a storage device such as the storage portion 6. In addition, some or all of the functional portions included in the control portion 7 may be constituted by electronic circuits. In addition, the operation control programs may be programs for causing a plurality of processors to function as the functional portions included in the control portion 7.

The first acquisition processing portion 41 acquires first temperature information regarding the temperature of the fixing belt 28A at the end of the first image formation process of forming an image on the first sheet whose size in the width direction along the rotation shaft 28G (see FIG. 1) is smaller than the reference size.

Specifically, the reference size is a size in the width direction of the maximum size sheet of the sheets on which an image can be formed in the image forming apparatus 100. For example, the maximum size of the sheets on which an image can be formed in the image forming apparatus 100 is the A3 portrait size. In this case, the reference size is the size in the width direction of the A3 portrait size. In addition, the first sheet is an A4 portrait size sheet or the like.

It is noted that the reference size may be a size smaller than the size in the width direction of the maximum size sheet of the sheets on which an image can be formed in the image forming apparatus 100.

For example, the first temperature information is both the number of sheets consecutively printed until the end of the first image formation process and the temperature detected by the second temperature sensor 28F at the end of the first image formation process. Here, the number of sheets consecutively printed until the end of the first image formation process is the total number of printed sheets in a plurality of first image formation processes executed consecutively.

The first determination processing portion 42 determines the execution time of the cooling process of cooling the fixing belt 28A based on the first temperature information.

Specifically, the cooling process is a process of rotating the fixing belt 28A and the pressure roller 28B in a state where execution of the image formation process of forming an image on a sheet is restricted and the driving of the heating portion 28D is stopped. It is noted that the cooling process may be a process of driving a cooling device such as an air blowing fan capable of cooling the fixing belt 28A in a state where the execution of the image formation process is restricted and the driving of the heating portion 28D is stopped.

For example, in the image forming apparatus 100, first table data indicating the correspondence relationship between a combination of the number of consecutively printed sheets and the temperature detected by the second temperature sensors 28F and the execution time of the cooling process is stored in the storage portion 6 in advance. In the first table data, the correspondence relationship between a combination of the number of consecutively printed sheets and the temperature detected by the second temperature sensors 28F and the execution time of the cooling process is defined such that the larger the number of consecutively printed sheets, the longer the execution time of the cooling process. In addition, in the first table data, the correspondence relationship between a combination of the number of consecutively printed sheets and the temperature detected by the second temperature sensor 28F and the execution time of the cooling process is defined such that the higher the detected temperature, the longer the execution time of the cooling process.

Then, the first determination processing portion 42 determines the execution time of the cooling process using the first table data.

It is noted that the first determination processing portion 42 may determine the execution time of the cooling process using a first calculation formula that can calculate the execution time of the cooling process based on the first temperature information.

In addition, the first temperature information may be one of the number of sheets consecutively printed until the end of the first image formation process and the temperature detected by the second temperature sensor 28F at the end of the first image formation process.

In addition, the first temperature information may be the temperature difference between the temperature detected by the second temperature sensor 28F at the end of the first image formation process and the temperature detected by the first temperature sensor 28E. In this case, instead of the first table data, table data may be used in which the correspondence relationship between the temperature difference and the execution time of the cooling process is defined such that the larger the temperature difference, the longer the execution time of the cooling process.

The second acquisition processing portion 43 acquires toner information regarding the amount of toner adhering to the secondary transfer roller 27 at the end of the first image formation process.

For example, the toner information is the number of sheets consecutively printed until the end of the first image formation process.

The second determination processing portion 44 determines the execution time of a removal process of removing the toner adhering to the secondary transfer roller 27, based on the toner information.

Specifically, the removal process is a process of supplying a current in a direction opposite to that of the secondary transfer current to the secondary transfer roller 27 using the transfer current supplying portion 27A in a state where the execution of the image formation process is restricted and the intermediate transfer belt 26 is being rotated. It is noted that the removal process may be a process of cleaning the surface of the secondary transfer roller 27 using a cleaning member capable of cleaning the surface of the secondary transfer roller 27.

For example, in the image forming apparatus 100, second table data indicating the correspondence relationship between the number of consecutively printed sheets and the execution time of the removal process is stored in the storage portion 6 in advance. In the second table data, the correspondence relationship between the number of consecutively printed sheets and the execution time of the removal process is defined such that the larger the number of consecutively printed sheets, the longer the execution time of the removal process.

Then, the second determination processing portion 44 determines the execution time of the removal process using the second table data.

It is noted that the second determination processing portion 44 may determine the execution time of the removal process using a second calculation formula that can calculate the execution time of the removal process based on the toner information.

In addition, the toner information may be information indicating the amount of toner detected by a sensor capable of detecting the toner adhering to the secondary transfer roller 27. In this case, instead of the second table data, table data may be used in which the correspondence relationship between the amount of toner and the execution time of the removal process is defined such that the larger the amount of toner, the longer the execution time of the removal process.

When the execution time of the cooling process determined by the first determination processing portion 42 exceeds a predetermined upper limit time, the restriction processing portion 45 restricts the execution of the cooling process exceeding the upper limit time.

Specifically, the upper limit time is determined based on the execution time of the removal process determined by the second determination processing portion 44. For example, the upper limit time is the same time as the execution time of the removal process determined by the second determination processing portion 44. It is noted that the upper limit time may be shorter than the execution time of the removal process determined by the second determination processing portion 44. In addition, the upper limit time may be a time determined independently of the execution time of the removal process determined by the second determination processing portion 44.

Here, the restriction processing portion 45 does not restrict the execution of the cooling process in a case where an instruction to execute the second image formation process of forming an image on the second sheet whose size in the width direction is larger than that of the first sheet on which an image was formed immediately before is received before the execution time of the cooling process reaches the upper limit time.

The termination processing portion 46 terminates the cooling process when an instruction to execute a third image formation process of forming an image on a third sheet whose size in the width direction is equal to or smaller than that of the first sheet on which an image was formed immediately before is received during the execution of the cooling process.

In addition, the termination processing portion 46 terminates the removal process in a case where the instruction to execute the third image formation process is received during the execution of the removal process.

The third acquisition processing portion 47 acquires second temperature information regarding the temperature of the fixing belt 28A at the time of receiving the instruction to execute the second image formation process in a case where the instruction to execute the second image formation process is received after the execution of the cooling process is restricted by the restriction processing portion 45.

For example, the second temperature information is both the number of sheets consecutively printed until the end of the immediately preceding first image formation process and the temperature detected by the second temperature sensor 28F at the time of receiving the instruction to execute the second image formation process.

The third determination processing portion 48 determines the execution time of the cooling process to be executed before the second image formation process, based on the second temperature information.

For example, the third determination processing portion 48 determines the execution time of the cooling process using the first table data.

It is noted that the third determination processing portion 48 may determine the execution time of the cooling processing using the first calculation formula.

In addition, the second temperature information may be one of the number of sheets consecutively printed until the end of the immediately preceding first image formation process and the temperature detected by the second temperature sensor 28F at the time of receiving the instruction to execute the second image formation process. In addition, the second temperature information may be the temperature difference between the temperature detected by the second temperature sensor 28F at the time of receiving the instruction to execute the second image formation process and the temperature detected by the first temperature sensor 28E. In addition, the second temperature information may include an elapsed time from the end of the immediately preceding first image formation process.

The shortening processing portion 49 shortens the execution time of the cooling process determined by the third determination processing portion 48, based on the elapsed time from the start to the end of the immediately preceding cooling process.

For example, the shortening processing portion 49 subtracts the entire elapsed time from the start to the end of the immediately preceding cooling process from the execution time of the cooling process determined by the third determination processing portion 48. It is noted that the shortening processing portion 49 may subtract a part of the elapsed time from the start to the end of the immediately preceding cooling process from the execution time of the cooling process determined by the third determination processing portion 48.

[Execution Restriction Process]

Figure 4:
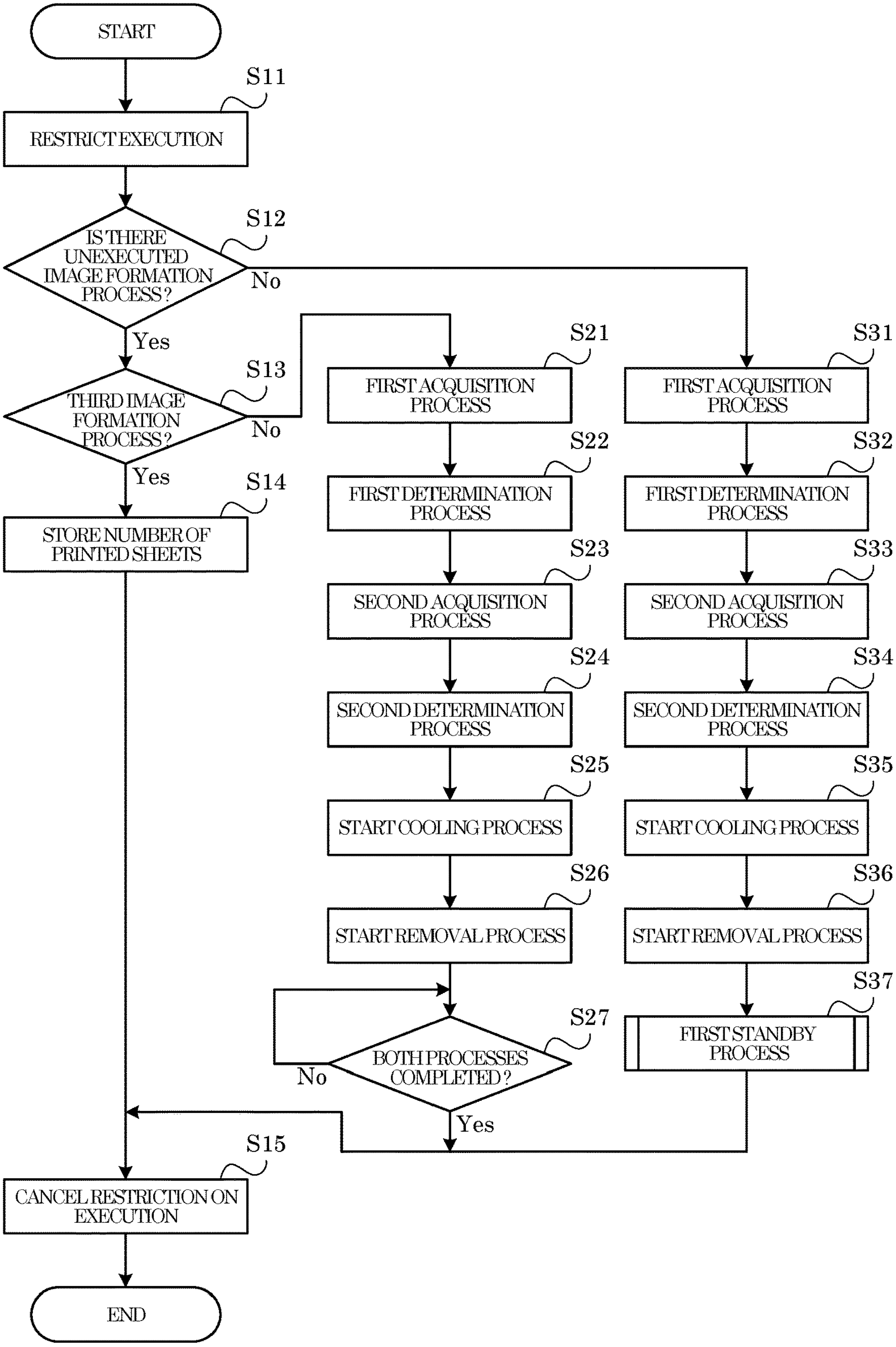
FIG. 4 is a flowchart showing an example of an execution restriction process executed in the image forming apparatus according to the embodiment of the present disclosure.

The cooling method of the present disclosure will be described with reference to FIG. 4, along with an example of the procedure of the execution restriction process executed by the control portion 7 in the image forming apparatus 100. Here, steps S11, S12, . . . represent the numbers of the processing procedure (steps) executed by the control portion 7. It is noted that the control portion 7 executes the execution restriction process when the execution of the first image formation process is completed.

<Step S11>

First, in step S11, the control portion 7 restricts the execution of the image formation process.

<Step S12>

In step S12, the control portion 7 determines whether or not there is an unexecuted image formation process.

Here, when the control portion 7 determines that there is an unexecuted image formation process (Yes in S12), the control portion 7 shifts the processing to step S13. In addition, when there is no unexecuted image formation process (No in S12), the control portion 7 shifts the processing to step S31.

<Step S13>

In step S13, the control portion 7 determines whether or not the next image formation process to be executed is the third image formation process. In other words, the control portion 7 determines whether or not the size in the width direction of the sheet to be used for image formation in the next image formation process to be executed is equal to or smaller than the size of the first sheet on which an image was formed immediately before.

Here, when the control portion 7 determines that the next image formation process to be executed is the third image formation process (Yes in S13), the control portion 7 shifts the processing to step S14. In addition, when the next image formation process to be executed is not the third image formation process (No in S13), the control portion 7 shifts the processing to step S21.

<Step S14>

In step S14, the control portion 7 stores the number of sheets printed in the immediately preceding first image formation process in a predetermined first storage area in the storage portion 6.

<Step S15>

In step S15, the control portion 7 cancels the restriction on the execution of the image formation process. Thus, the unexecuted image formation process is executed.

<Step S21>

In step S21, the control portion 7 executes a first acquisition process of acquiring the first temperature information. Here, the process of step S21 is executed by the first acquisition processing portion 41 of the control portion 7.

Specifically, in the first acquisition process, the number of sheets consecutively printed until the end of the first image formation process is acquired based on the number of sheets printed in the immediately preceding first image formation process and the information stored in the first storage area of the storage portion 6. In addition, in the first acquisition process, the second temperature sensor 28F is used to acquire the temperature detected by the second temperature sensor 28F.

<Step S22>

In step S22, the control portion 7 executes a first determination process of determining the execution time of the cooling process, based on the first temperature information acquired in step S21. Here, the process of step S22 is executed by the first determination processing portion 42 of the control portion 7.

Specifically, in the first determination process, the first table data is used to determine the execution time of the cooling process.

<Step S23>

In step S23, the control portion 7 executes a second acquisition process of acquiring the toner information. Here, the process of step S23 is executed by the second acquisition processing portion 43 of the control portion 7.

Specifically, in the second acquisition process, the number of sheets consecutively printed until the end of the first image formation process is acquired based on the number of sheets printed in the immediately preceding first image formation process and the information stored in the first storage area of the storage portion 6.

<Step S24>

In step S24, the control portion 7 executes a second determination process of determining the execution time of the removal process, based on the toner information acquired in step S23. Here, the process of step S24 is executed by the second determination processing portion 44 of the control portion 7.

Specifically, in the second determination process, the second table data is used to determine the execution time of the removal process.

<Step S25>

In step S25, the control portion 7 starts the cooling process.

Specifically, the control portion 7 rotates the fixing belt 28A and the pressure roller 28B in a state where the driving of the heating portion 28D is stopped.

<Step S26>

In step S26, the control portion 7 starts the removal process.

Specifically, the control portion 7 supplies a current in a direction opposite to that of the secondary transfer current to the secondary transfer roller 27 using the transfer current supplying portion 27A in a state where the intermediate transfer belt 26 is being rotated.

<Step S27>

In step S27, the control portion 7 determines whether or not both the cooling process and the removal process have been completed.

Here, when the control portion 7 determines that both the cooling process and the removal process have been completed (Yes in S27), the control portion 7 shifts the processing to step S15. When both the cooling process and the removal process have not been completed (No in S27), the control portion 7 waits for both the cooling process and the removal process to be completed in step S27.

<Step S31>

In step S31, the control portion 7 executes the first acquisition process. Here, the process of step S31 is an example of the acquisition step of the present disclosure, and is executed by the first acquisition processing portion 41 of the control portion 7.

<Step S32>

In step S32, the control portion 7 executes the first determination process. Here, the process of step S32 is an example of the determination step of the present disclosure, and is executed by the first determination processing portion 42 of the control portion 7.

<Step S33>

In step S33, the control portion 7 executes the second acquisition process. Here, the process of step S33 is executed by the second acquisition processing portion 43 of the control portion 7.

<Step S34>

In step S34, the control portion 7 executes the second determination process. Here, the process of step S34 is executed by the second determination processing portion 44 of the control portion 7.

<Step S35>

In step S35, the control portion 7 starts the cooling process.

<Step S36>

In step S36, the control portion 7 starts the removal process.

<Step S37>

In step S37, the control portion 7 executes a first standby process to be described below.

[First Standby Process]

Figure 5:
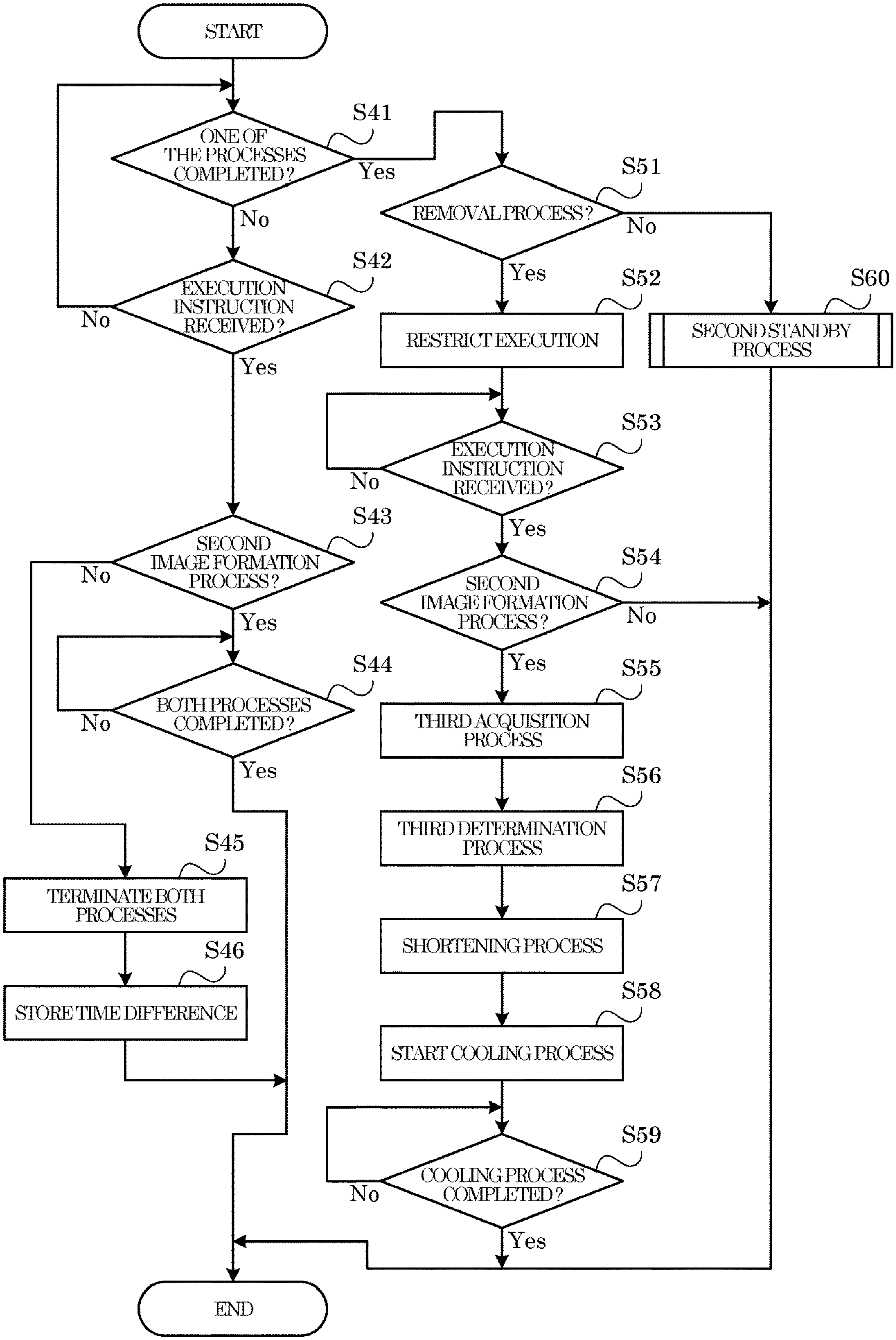
FIG. 5 is a flowchart showing an example of a first standby process executed in the image forming apparatus according to the embodiment of the present disclosure.

Next, the first standby process executed in step S37 of the execution restriction process will be described with reference to FIG. 5.

<Step S41>

First, in step S41, the control portion 7 determines whether or not one of the cooling process and the removal process has been completed.

Here, when the control portion 7 determines that one of the cooling process and the removal process has been completed (Yes in S41), the control portion 7 shifts the processing to step S51. In addition, when neither the cooling process nor the removal process has been completed (No in S41), the control portion 7 shifts the processing to step S42.

<Step S42>

In step S42, the control portion 7 determines whether or not an instruction to execute the image formation process has been received.

Here, when the control portion 7 determines that an instruction to execute the image formation process has been received (Yes in S42), the control portion 7 shifts the processing to step S43. In addition, when an instruction to execute the image formation process has not been received (No in S42), the control portion 7 shifts the processing to step S41.

<Step S43>

In step S43, the control portion 7 determines whether or not the image formation process instructed to be executed is the second image formation process. In other words, the control portion 7 determines whether or not the size in the width direction of the sheet to be used for image formation in the image formation process instructed to be executed is larger than the size of the first sheet on which an image was formed immediately before.

Here, when the control portion 7 determines that the image formation process instructed to be executed is the second image formation process (Yes in S43), the control portion 7 shifts the processing to step S44. In addition, when the image formation process instructed to be executed is not the second image formation process (i.e., when it is the third image formation process) (No in S43), the control portion 7 shifts the processing to step S45.

<Step S44>

In step S44, the control portion 7 determines whether or not both the cooling process and the removal process have been completed.

Here, when the control portion 7 determines that both the cooling process and the removal process have been completed (Yes in S44), the control portion 7 terminates the first standby process. When both the cooling process and the removal process have not been completed (No in S44), the control portion 7 waits for both the cooling process and the removal process to be completed in step S44.

<Step S45>

In step S45, the control portion 7 forcibly terminates both the cooling process and the removal process that are being executed. Here, the process of step S45 is executed by the termination processing portion 46 of the control portion 7.

<Step S46>

In step S46, the control portion 7 stores the time difference between the execution time of the cooling process determined in the process of step S32 and the elapsed time from the start to the end of the cooling process in a second storage area different from the first storage area in the storage portion 6. In addition, the control portion 7 stores, in the second storage area of the storage portion 6, the time difference between the execution time of the removal process determined in the process of step S34 and the elapsed time from the start to the end of the removal process.

Here, in the process of step S22 or step S32, which is executed first after step S46, the control portion 7 adds the time difference corresponding to the cooling process stored in the second storage area of the storage portion 6 to the execution time of the cooling process determined in the first determination process. In addition, in the process of step S24 or step S34, which is executed first after step S46, the control portion 7 adds the time difference corresponding to the removal process stored in the second storage area of the storage portion 6 to the execution time of the removal process determined in the second determination process. Thus, when both the cooling process and the removal process are terminated in the middle of the processes, it is possible to reflect the unfinished portions of the cooling process and the removal process in the execution times of the cooling process and the removal process to be executed next.

<Step S51>

In step S51, the control portion 7 determines whether or not the terminated process is the removal process.

Here, when the control portion 7 determines that the terminated process is the removal process (Yes in S51), the control portion 7 shifts the processing to step S52. In addition, when the terminated process is not the removal process (No in S51), the control portion 7 shifts the processing to step S60.

<Step S52>

In step S52, the control portion 7 restricts the execution of the cooling process. That is, the control portion 7 forcibly terminates the cooling process being executed. Here, the process of step S52 is an example of the restriction step of the present disclosure, and is executed by the restriction processing portion 45 of the control portion 7.

<Step S53>

In step S53, the control portion 7 determines whether or not an instruction to execute the image formation process has been received.

Here, when the control portion 7 determines that an instruction to execute the image formation process has been received (Yes in S53), the control portion 7 shifts the processing to step S54. In addition, when an instruction to execute the image formation process has not been received (No in S53), the control portion 7 waits for an instruction to execute the image formation process in step S53.

<Step S54>

In step S54, the control portion 7 determines whether or not the image formation process instructed to be executed is the second image formation process. In other words, the control portion 7 determines whether or not the size in the width direction of the sheet to be used for image formation in the image formation process instructed to be executed is larger than the size of the first sheet on which an image was formed immediately before.

Here, when the control portion 7 determines that the image formation process instructed to be executed is the second image formation process (Yes in S54), the control portion 7 shifts the processing to step S55. In addition, when the image formation process instructed to be executed is not the second image formation process (i.e., when it is the third image formation process) (No in S54), the control portion 7 terminates the first standby process.

<Step S55>

In step S55, the control portion 7 executes a third acquisition process of acquiring the second temperature information. Here, the process of step S55 is executed by the third acquisition processing portion 47 of the control portion 7.

Specifically, in the third acquisition process, the number of sheets consecutively printed until the end of the first image formation process is acquired based on the number of sheets printed in the immediately preceding first image formation process and the information stored in the first storage area of the storage portion 6. In addition, in the third acquisition process, the second temperature sensor 28F is used to acquire the temperature detected by the second temperature sensor 28F.

<Step S56>

In step S56, the control portion 7 executes a third determination process of determining the execution time of the cooling process, based on the second temperature information acquired in step S55. Here, the process of step S56 is executed by the third determination processing portion 48 of the control portion 7.

Specifically, in the third determination process, the first table data is used to determine the execution time of the cooling process.

<Step S57>

In step S57, the control portion 7 shortens the execution time of the cooling process determined by the process of step S56, based on the elapsed time from the start to the end of the immediately preceding cooling process. Here, the process of step S57 is executed by the shortening processing portion 49 of the control portion 7.

Specifically, the control portion 7 subtracts the entire elapsed time from the start to the end of the immediately preceding cooling process from the execution time of the cooling process determined by the process of step S56. Thus, when the cooling process is executed after the execution of the cooling process is restricted, it is possible to reflect the finished portion of the previous cooling process in the execution time of the subsequent cooling process.

<Step S58>

In step S58, the control portion 7 starts the cooling process.

<Step S59>

In step S59, the control portion 7 determines whether or not the cooling process has been completed.

Here, when the control portion 7 determines that the cooling process has been completed (Yes in S59), the control portion 7 terminates the first standby process. When the cooling process has not been completed (No in S59), the control portion 7 waits for the cooling process to be completed in step S59.

<Step S60>

In step S60, the control portion 7 executes a second standby process to be described below.

[Second Standby Process]

Figure 6:
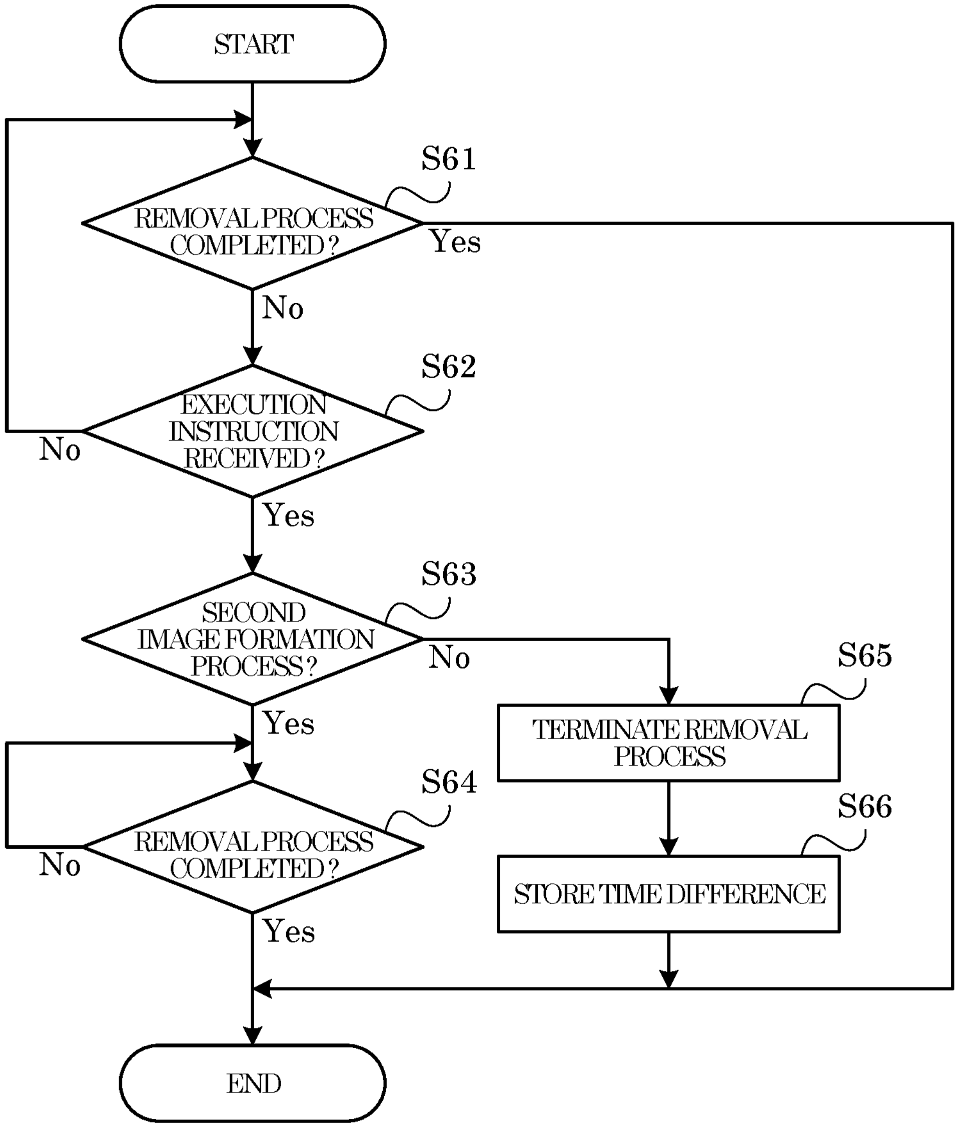
FIG. 6 is a flowchart showing an example of a second standby process executed in the image forming apparatus according to the embodiment of the present disclosure.

Next, the second standby process executed in step S60 of the first standby process will be described with reference to FIG. 6.

<Step S61>

First, in step S61, the control portion 7 determines whether or not the removal process has been completed.

Here, when the control portion 7 determines that the removal process has been completed (Yes in S61), the control portion 7 terminates the second standby process. In addition, when the removal process has not been completed (No in S61), the control portion 7 shifts the processing to step S62.

<Step S62>

In step S62, the control portion 7 determines whether or not an instruction to execute the image formation process has been received.

Here, when the control portion 7 determines that an instruction to execute the image formation process has been received (Yes in S62), the control portion 7 shifts the processing to step S63. In addition, when an instruction to execute the image formation process has not been received (No in S62), the control portion 7 shifts the processing to step S61.

<Step S63>

In step S63, the control portion 7 determines whether or not the image formation process instructed to be executed is the second image formation process. In other words, the control portion 7 determines whether or not the size in the width direction of the sheet to be used for image formation in the image formation process instructed to be executed is larger than the size of the first sheet on which an image was formed immediately before.

Here, when the control portion 7 determines that the image formation process instructed to be executed is the second image formation process (Yes in S63), the control portion 7 shifts the processing to step S64. In addition, when the image formation process instructed to be executed is not the second image formation process (i.e., when it is the third image formation process) (No in S63), the control portion 7 shifts the processing to step S65.

<Step S64>

In step S64, the control portion 7 determines whether or not the removal process has been completed.

Here, when the control portion 7 determines that the removal process has been completed (Yes in S64), the control portion 7 terminates the second standby process. When the removal process has not been completed (No in S64), the control portion 7 waits for the removal process to be completed in step S64.

<Step S65>

In step S65, the control portion 7 forcibly terminates the removal process being executed. Here, the process of step S65 is executed by the termination processing portion 46 of the control portion 7.

<Step S66>

In step S66, the control portion 7 stores, in the second storage area of the storage portion 6, the time difference between the execution time of the removal process determined in the process of step S34 and the elapsed time from the start to the end of the removal process.

Here, in the process of step S24 or step S34, which is executed first after step S66, the control portion 7 adds the time difference corresponding to the removal process stored in the second storage area of the storage portion 6 to the execution time of the removal process determined in the second determination process. Thus, when the removal process is terminated in the middle of the process, it is possible to reflect the unfinished portion of the removal process in the execution time of the removal process to be executed next.

As described above, in the image forming apparatus 100, when the determined execution time of the cooling process exceeds the upper limit time, the execution of the cooling process exceeding the upper limit time is restricted. With this configuration, in comparison to a configuration in which the cooling process is executed unlimitedly after execution of the first image formation process, it is possible to suppress unnecessary cooling of the fixing belt 28A.

In addition, in the image forming apparatus 100, the upper limit time is determined based on the execution time of the removal process. Thus, it is possible to prevent the cooling process from being executed longer than the removal process. Therefore, in comparison to a configuration in which the cooling process is executed longer than the removal process, it is possible to suppress the occurrence of noise caused by the driving of the image forming portion 3.

Further, in the image forming apparatus 100, in a case where an instruction to execute the second image formation process is received before the execution time of the cooling process reaches the upper limit time, the execution of the cooling process is not restricted. With this configuration, it is possible to suppress the occurrence of the high-temperature offset during the execution of the second image formation process for which the execution instruction has been received.

In addition, in the image forming apparatus 100, when an instruction to execute the third image formation process is received during execution of the cooling process, the cooling process is forcibly terminated. When the image formation process executed after the first image formation process is the third image formation process, the high-temperature offset does not occur during the execution of the third image formation process. Therefore, it is meaningless to continue the cooling process after the instruction to execute the third image formation process is received. That is, with the above-described configuration, it is possible to avoid unnecessary delay in execution of the third image formation process.

APPENDIXES TO DISCLOSURE

The following are appendixes to the overview of the disclosure extracted from the above embodiment. It is noted that the structures and processing functions to be described in the following appendixes can be selected and combined arbitrarily.

Appendix 1

An image forming apparatus comprising: a fixing portion provided rotatably around a predetermined rotation shaft and configured to fix a toner image to a sheet; a first acquisition processing portion configured to acquire first temperature information regarding a temperature of the fixing portion at an end of a first image formation process of forming an image on a first sheet whose size in a width direction along the rotation shaft is smaller than a predetermined reference size; a first determination processing portion configured to determine an execution time of a cooling process of cooling the fixing portion based on the first temperature information;

and a restriction processing portion configured to restrict execution of the cooling process exceeding a predetermined upper limit time when the execution time of the cooling process determined by the first determination processing portion exceeds the upper limit time.

Appendix 2

The image forming apparatus according to Appendix 1, further comprising: a transfer portion configured to transfer the toner image to the sheet; a second acquisition processing portion configured to acquire toner information regarding an amount of toner adhering to the transfer portion at the end of the first image formation process; and a second determination processing portion configured to determine an execution time of a removal process of removing the toner adhering to the transfer portion, based on the toner information, wherein the upper limit time is determined based on the execution time of the removal process determined by the second determination processing portion.

Appendix 3

The image forming apparatus according to Appendix 1 or 2, wherein the restriction processing portion refrains from restricting the execution of the cooling process in a case where an instruction to execute a second image formation process of forming an image on a second sheet whose size in the width direction is larger than that of the first sheet on which an image was formed immediately before is received before the execution time of the cooling process reaches the upper limit time.

Appendix 4

The image forming apparatus according to any one of Appendixes 1 to 3, further comprising: a third acquisition processing portion configured to acquire second temperature information regarding a temperature of the fixing portion at a time of receiving an instruction to execute a second image formation process of forming an image on a second sheet whose size in the width direction is larger than that of the first sheet on which an image was formed immediately before, in a case where the instruction to execute the second image formation process is received after the restriction of the execution of the cooling process by the restriction processing portion; a third determination processing portion configured to determine an execution time of the cooling process to be executed before the second image formation process, based on the second temperature information; and a shortening processing portion configured to shorten the execution time of the cooling process determined by the third determination processing portion, based on an elapsed time from a start to an end of an immediately preceding cooling process.

Appendix 5

The image forming apparatus according to any one of Appendixes 1 to 4, further comprising a termination processing portion configured to terminate the cooling process in a case where an instruction to execute a third image formation process of forming an image on a third sheet whose size in the width direction is equal to or smaller than that of the first sheet on which an image was formed immediately before is received during the execution of the cooling process.

Appendix 6

A cooling method executed by an image forming apparatus including a fixing portion provided rotatably around a predetermined rotation shaft and configured to fix a toner image to a sheet, the cooling method comprising: an acquisition step of acquiring first temperature information regarding a temperature of the fixing portion at an end of a first image formation process of forming an image on a first sheet whose size in a width direction along the rotation shaft is smaller than a predetermined reference size; a determination step of determining an execution time of a cooling process of cooling the fixing portion based on the first temperature information; and a restriction step of restricting execution of the cooling process exceeding a predetermined upper limit time when the execution time of the cooling process determined by the determination step exceeds the upper limit time.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a fixing portion provided rotatably around a predetermined rotation shaft and configured to fix a toner image to a sheet;

a first acquisition processing portion configured to acquire first temperature information regarding a temperature of the fixing portion at an end of a first image formation process of forming an image on a first sheet whose size in a width direction along the rotation shaft is smaller than a predetermined reference size;

a first determination processing portion configured to determine an execution time of a cooling process of cooling the fixing portion based on the first temperature information; and a restriction processing portion configured to restrict execution of the cooling process exceeding a predetermined upper limit time when the execution time of the cooling process determined by the first determination processing portion exceeds the upper limit time.

2. The image forming apparatus according to claim 1, further comprising:

a transfer portion configured to transfer the toner image to the sheet;

a second acquisition processing portion configured to acquire toner information regarding an amount of toner adhering to the transfer portion at the end of the first image formation process; and a second determination processing portion configured to determine an execution time of a removal process of removing the toner adhering to the transfer portion, based on the toner information, wherein the upper limit time is determined based on the execution time of the removal process determined by the second determination processing portion.

3. The image forming apparatus according to claim 1, wherein the restriction processing portion refrains from restricting the execution of the cooling process in a case where an instruction to execute a second image formation process of forming an image on a second sheet whose size in the width direction is larger than that of the first sheet on which an image was formed immediately before is received before the execution time of the cooling process reaches the upper limit time.

4. The image forming apparatus according to claim 1, further comprising:

a second acquisition processing portion configured to acquire second temperature information regarding a temperature of the fixing portion at a time of receiving an instruction to execute a second image formation process of forming an image on a second sheet whose size in the width direction is larger than that of the first sheet on which an image was formed immediately before, in a case where the instruction to execute the second image formation process is received after the restriction of the execution of the cooling process by the restriction processing portion;

a second determination processing portion configured to determine an execution time of the cooling process to be executed before the second image formation process, based on the second temperature information; and a shortening processing portion configured to shorten the execution time of the cooling process determined by the second determination processing portion, based on an elapsed time from a start to an end of an immediately preceding cooling process.

5. The image forming apparatus according to claim 1, further comprising:

a termination processing portion configured to terminate the cooling process in a case where an instruction to execute a second image formation process of forming an image on a second sheet whose size in the width direction is equal to or smaller than that of the first sheet on which an image was formed immediately before is received during the execution of the cooling process.

6. A cooling method executed by an image forming apparatus including a fixing portion provided rotatably around a predetermined rotation shaft and configured to fix a toner image to a sheet, the cooling method comprising:

an acquisition step of acquiring first temperature information regarding a temperature of the fixing portion at an end of a first image formation process of forming an image on a first sheet whose size in a width direction along the rotation shaft is smaller than a predetermined reference size;

a determination step of determining an execution time of a cooling process of cooling the fixing portion based on the first temperature information; and a restriction step of restricting execution of the cooling process exceeding a predetermined upper limit time when the execution time of the cooling process determined by the determination step exceeds the upper limit time.

* * * * *